Jan. 24, 1933.  W. JOSSELYN  1,895,248
CAMERA
Filed Feb. 2, 1931  2 Sheets-Sheet 1
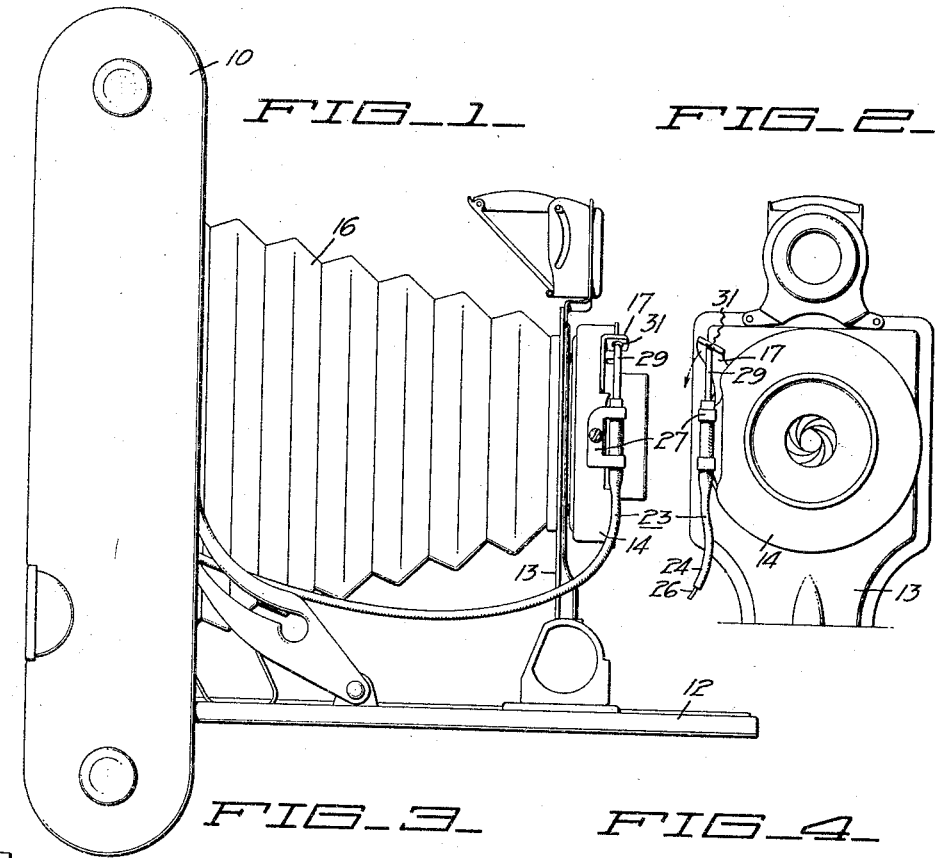
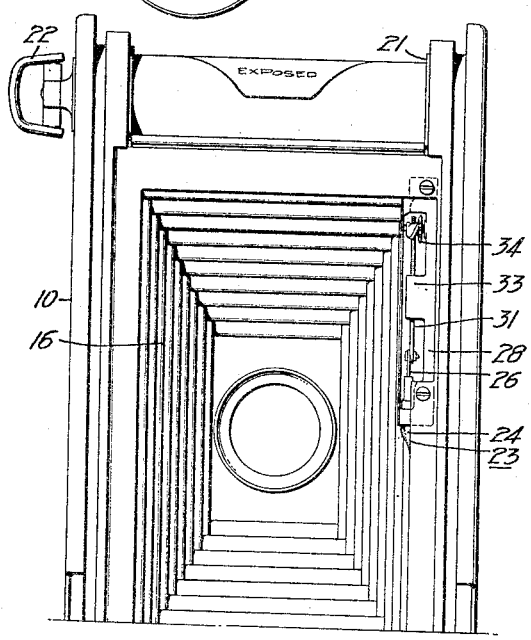
INVENTOR.
Winsor Josselyn
BY
White, Prost, Fisher & Lothrop
ATTORNEYS.

Jan. 24, 1933.  W. JOSSELYN  1,895,248
CAMERA
Filed Feb. 2, 1931  2 Sheets-Sheet 2
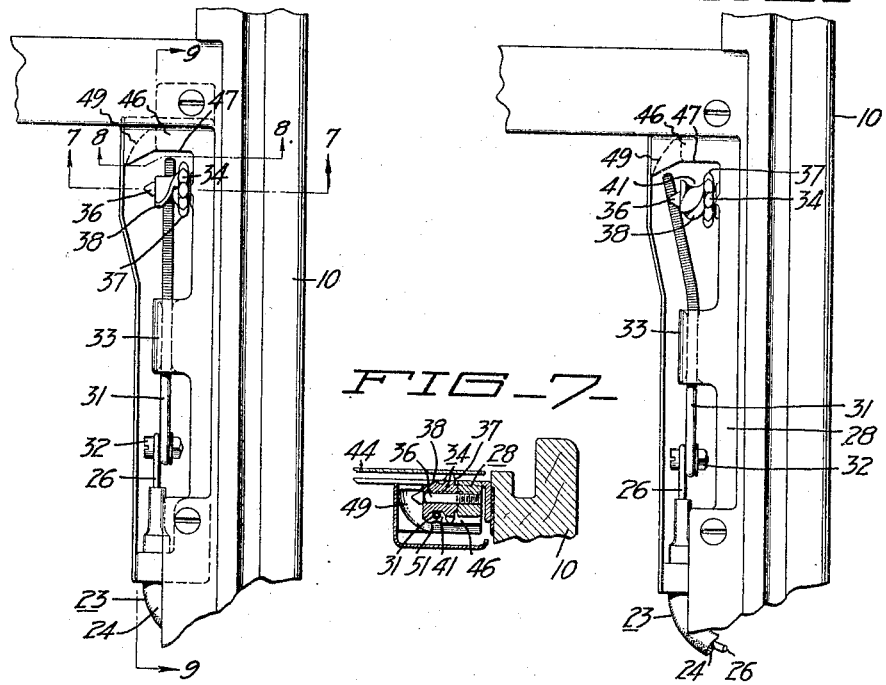
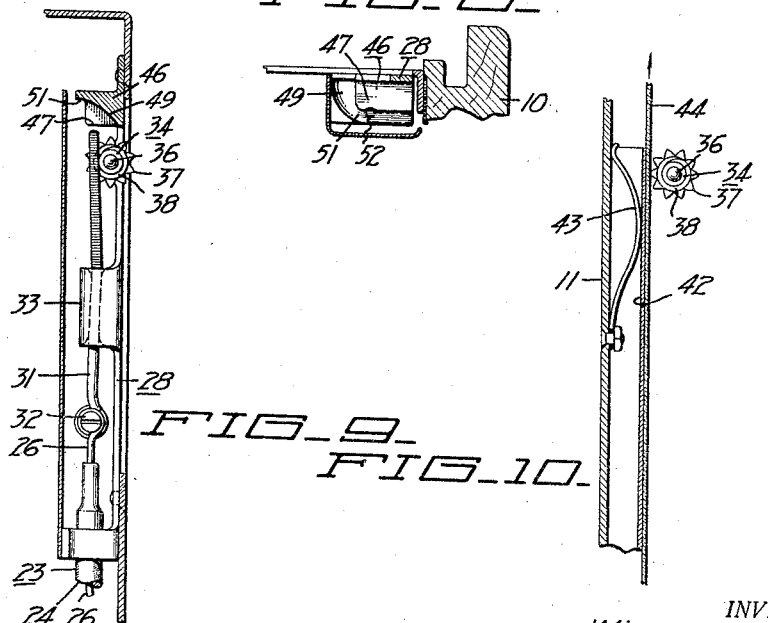
INVENTOR.
Winsor Josselyn
BY
White, Prost, Hehr & Lothrop
ATTORNEYS.

Patented Jan. 24, 1933

1,895,248

UNITED STATES PATENT OFFICE

WINSOR JOSSELYN, OF CARMEL, CALIFORNIA

CAMERA

Application filed February 2, 1931. Serial No. 512,873.

This invention relates generally to cameras for taking photographic exposures upon a sensitized film or equivalent surface, particularly portable cameras of the type which are utilized in taking isolated exposures.

As disclosed in my Patents No. 1,850,460 dated March 22, 1932 and No. 1,876,143, dated Sept. 6, 1932, I have previously devised cameras having automatic provision for preventing double exposures. As applied to portable cameras of the roll film type, the structures which I have previously devised utilize some form of latching or locking means in conjunction with the shutter, which after operation of the shutter to effect exposure, automatically locks the shutter against further operation. Mounted upon the body of the camera there is a cam or equivalent mechanism which is connected to the latching or locking means thru a flexible cable. When the operator winds up the film to replace the exposed portion with an unexposed portion, an impulse is applied to the latching or locking means to release the shutter, thus permitting another exposure. While these prior structures have been demonstrated to be practical and operative, they are subject to certain disadvantages. For example the latching or locking means sometimes retards proper rapid operation of the shutter. Likewise the mechanism for applying a releasing impulse made it necessary for the operator to use some care to preclude stopping of the film roll in such a position as might render the locking or latching means ineffective. Furthermore in certain instances I deem it undesirable to have the locking or latching means mounted in conjunction with the shutter mechanism, particularly if exposed, as it may become damaged or rendered inoperative by accumulation of foreign matter.

It is an object of the present invention to devise an improved camera construction of the above type which will overcome the above mentioned disadvantages. The invention is characterized by the fact that the locking or latching means is located within the body portion of a camera instead of being mounted on or adjacent the shutter mechanism. It is also characterized by the fact that the means for releasing the lock operates by movement of a film or equivalent sensitized surface, and therefore after the film or sensitized surface has been moved a sufficient distance to effect a release, it may be stopped in any position without rendering the locking means ineffective to lock the shutter against further operation upon a successive exposure.

It is a further object of the invention to devise such a camera which will require a relatively small amount of force to effect a release of the locking means, and which will therefore not seriously interfere with movement of the film.

It is a further object of the invention to devise a camera of the above character which will be characterized by simplicity of elements and reliability of operation.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

Referring to the drawings:

Figure 1 is a side elevational view, illustrating a camera incorporating the present invention.

Fig. 2 is a front elevational view of a camera as shown in Fig. 1.

Fig. 3 is a rear view of the camera shown in Fig. 1, with the back of the camera removed to expose the interior parts.

Fig. 4 is a view illustrating the construction of the interior face of the camera back.

Fig. 5 is an enlarged detail view illustrating the locking and releasing means mounted within the body of my camera.

Fig. 6 is a view similar to Fig. 5, but showing the parts in a different operating position.

Fig. 7 is a cross sectional detail taken along the line 7—7 of Fig. 5.

Fig. 8 is a cross sectional detail taken along the line 8—8 of Fig. 5.

Fig. 9 is a cross sectional detail taken along the line 9—9 of Fig. 5.

Fig. 10 is a cross sectional detail taken along the line 10—10 of Fig. 4 illustrating the manner in which the film is maintained in contact with the rotating wheel or roller of the releasing means.

The camera as shown in Fig. 1 consists of a hollow body portion or box 10, which is provided with a removable back wall 11 (Fig. 4). The front of the body portion is provided with a door 12 which swings down to the position shown in Fig. 1, and which when in such position serves as a guide for a shutter supporting plate 13. Shutter mechanism 14 and suitable lenses are carried by plate 13, and the space between the plate and the interior of the body portion 10 is enclosed by a suitable extensible bellows 16. When not in use plate 13 together with the shutter mechanism is retracted within the body portion 10 and door 12 latched in closed position. As thus far described, the camera is similar to those available upon the open market.

As is well known to those skilled in the art, various types of shutter mechanisms are utilized with portable cameras such as described above. For example in one type two actuating levers are employed, one being for cocking the spring of the shutter, and the other being for releasing the shutter. In another type, which has been illustrated in Figs. 1 and 2, a single actuating lever 17 is provided. In taking snap shots or instantaneous exposures with a shutter of this type, lever 17 is depressed from an initial position to a lowered position, during which movement of the spring of the shutter is tensioned. Near the end of this movement the shutter is released to effect an exposure, after which lever 17 is released and permitted to return to its initial position. In taking time exposures lever 17 is depressed twice, once to open the shutter, following which lever 17 will not completely return to initial position, and a second movement to release and close the shutter, after which lever 17 will completely return to initial position. Assuming therefore that after each complete operation of the shutter mechanism to effect an exposure, if lever 17 is locked in initial position, it is impossible to take a succeeding exposure until this lever is released. It is obvious that in other forms of shutter mechanisms which are available, there is some moving element or part, whether exposed for manual operation or housed within the shutter casing, which if locked in a certain position during or following a shutter operation, will lock the shutter against further operation until released. For simplicity I have illustrated my invention as serving to lock lever 17 in its initial position.

It is also apparent from an inspection of Figs. 1 and 2 that the particular type of camera disclosed utilizes the well known film roll. In cameras of this type a roll of fresh film is removably journaled within one end of the body portion 10, in this instance the lower end. Within the other end of the body portion there is a removable roller 21 which is journaled, and which can be rotated by the external ring 22. In operating the camera the end of the film is engaged with roller 21, and then by rotating a ring 22, the film can be wound up upon roller 21 to bring a sensitized portion of the film in position to receive an exposure. After one exposure has been made ring 22 is rotated to wind up the exposed portion and to bring the next succeeding unexposed portion in position. It may be explained that while my invention is particularly adapted to a camera of this type utilizing a film roll, it can be utilized in any camera in which a sensitized film, plate, or equivalent member, is moved in the direction of its plane to position a fresh sensitized surface for taking another exposure. For example reference is made to cameras utilizing film packs in which exposed film portions are moved in such a manner as to expose fresh surfaces.

Considering only that camera with which I have chosen to illustrate my invention, extending from the body portion 10 to the shutter mechanism 14 there is a flexible cable 23. This cable may be similar to those ordinarily employed for operating shutter mechanisms, and consists for example of an outer flexible sheath 24 and an inner elongated flexible member 26. One end of this cable is mounted upon the casing of shutter mechanism 14, by means of bracket 27, while the other end enters the dark space of body portion 10 and is mounted upon bracket 28, which will be presently explained. The end of elongated member 26 adjacent the shutter mechanism is connected with a slidable projecting pin 29, the upper end of which can be rounded like a ball to fit within a socket 31 provided upon actuating lever 17. Therefore it is evident that pin 29 is depressed or forced inwardly with respect to the cable upon depressing lever 17. It may be explained at this point that cable 23 is provided with an inner spring or equivalent means whereby pin 29 is always biased toward a projected position, so that by virtue of this bias the upper end of this pin is retained within socket 31.

Bracket 28 is mounted upon one side of the body portion 10 as shown in Figs. 3 and 5, in order that the working parts mounted thereon may not interfere with the area of the sensitized film surface upon which the exposures are to be made. With respect to the parts mounted upon bracket 28, it can be briefly pointed out that they perform two principal functions. After an exposure has been made by operation of shutter mechanism 14, they serve to lock or restrict elongated member 26 against movement, in such a manner as to prevent a successive depression of lever 17. They also function by virtue of an engagement with the edge of the film, to release this lock or restriction upon movement of member 26 when the film is moved to bring an unexposed film portion in position for the next exposure.

The functions outlined above for the parts carried by bracket 28, can best be understood after a detailed description thereof. Thus referring to Figs. 5 to 9 inclusive, the projecting end portion of elongated member 26 is secured to the lower end of an elongated finger 31, the connection in this instance being represented by bolt 32 engaging an eye in the end of member 26, and a corresponding eye in the lower end of finger 31. Finger 31 extends thru an aperture in guide portion 33 carried by bracket 28. At least that portion of finger 31 extending above guide portion 33 is preferably relatively resilient or springy, that is it tends to spring back to linear form upon being bent laterally. To demonstrate operativeness of my invention I have utilized a wound piano wire having the lower portion within and below guide portion 33 made comparatively rigid by application of solder. Adjacent the upper portion of bracket 28 there is a roller or wheel 34, which is rotatably mounted upon stud 36. This roller has a toothed peripheral portion 37 adapted to engage with the edge of the film, and an adjacent portion formed with a curved rib 38, which serves to form a helicoidal groove 41.

It will be noted that the axis of rotation of wheel 34 is parallel to the plane of the film, and at right angles to the direction of movement of the film. Inasmuch as it is intended that this roller 34 be rotated by movement of the film, it is desirable to provide means for resiliently pressing the edge portion of the film in frictional contact with the toothed peripheral portion 37. Thus as shown in Fig. 10 the removable back 11 of the body is provided with spring metal strips 42 for engaging the edge portion of the film. That portion of the one resilient strip 42 which is adjacent roller 34, is reinforced by a leaf spring 43. Thus the film 44 is resiliently pressed against toothed portion 37, so that upon movement of the film, roller 34 is positively rotated.

As is apparent from Fig. 9, finger 31 is normally held in such a position that its upper portion is slightly bent, and therefore it is normally biased by its inherent resilience into engagement with the groove 41 of roller 34. Assuming now that the upper portion of finger 31 occupies a position with respect to roller 34 shown in Fig. 5, it is apparent that upon rotation of roller 34 in one direction, as by movement of a film in contact with toothed portion 37, the upper portion of finger 31 will be transposed laterally to the position shown in Fig. 6. Further rotation of roller 34 will have no effect upon finger 31. Mounted upon the upper end of bracket 28 there is an abutment 46, the lower surface 47 of which is of limited area.

When the upper portion of finger 31 is in the position illustrated in Fig. 5, the upper end of this finger directly underlies abutment 46. Therefore in this position abutment 46 interferes with the upward movement of this finger, and this interference places a restriction upon movement of elongated member 26. It is obvious that such restriction will serve to prevent depression of actuating lever 17 to operate the shutter mechanism. Therefore this position of the finger 31 illustrated in Fig. 5 can be termed the "locked position". Assuming now that rotation of roller 34 transposes the upper end of finger 31 to the position shown in Fig. 6, the upper end of this finger is now to one side of abutment 46, and therefore the restriction to its upward movement is removed. Therefore for this position of the finger the restriction upon movement of elongated member 26 is removed and actuating member 17 can be depressed to operate the shutter mechanism. This position can be termed the "released position".

Immediately overlying the upper end of finger 31 for that position shown in Fig. 6, there is a cam like deflection member 49. The lower surface 51 of this deflection member 49 which appears in Figs. 7 and 8, is so curved that upon upward movement of finger 31 from the position shown in Fig. 6, the upper end of the finger is bent forwardly from the position shown in Fig. 6, out of engagement with wheel 34, and caused to assume a position as indicated at 52 in Fig. 8. When finger 31 is again lowered to its initial position, its natural resilience causes it to spring back into engagement with wheel 34 as shown in Fig. 5, so that the upper end of the finger again directly underlies the abutment 46. Therefore after finger 31 has been transposed to the position shown in Fig. 6, cyclic movement of this finger, which consists of an upward movement followed by a lowering movement back to its original position, causes the finger to again assume locked position. Obviously such a cyclic movement of finger 31 takes place during a shutter operation, in which lever 17 is depressed and then released to return to initial position.

Operation of my complete camera will be apparent from the above description, but will be briefly reviewed for the sake of clarity. Assuming that a film has been placed within the camera and that an unexposed portion has been properly positioned, the operator makes the exposure by depressing actuating lever 17, after which this lever is released to return to initial position. Before depressing lever 17, finger 31 occupies released position as shown in Fig. 6. After depression of lever 17 finger 31 occupies locked position as shown in Fig. 5. Now if the operator should attempt to make another exposure without properly winding up the exposed portion, the upper end of finger 31 contacts with abutment 46, to prevent depression of lever 17. The operator then winds up the exposed film portion, and upon first part of the movement of the film (the edge of which is in frictional contact with toothed portion 37 of wheel 34) wheel 34 is rotated to move finger 31 to the released position shown in Fig. 6. Subsequent operations are identical with those described.

In connection with flexible cable 23, it should be noted that the elongated flexible member 26 of this cable should be of such a character that it is relatively rigid to compression. It should also be capable of withstanding the compressional forces to which it may be subjected in attempted improper operation. Obviously other types of motion applying means might be utilized as a connection between the shutter mechanism and the locking and releasing mechanism mounted within the body of the camera.

The desirable characteristics of my camera will be obvious. After roller 34 has rotated sufficiently far to move finger 31 to released position, further rotation will have no effect, and the wheel can stop in any position. Furthermore rotation of this wheel to move finger 31 to released position requires very little turning torque so that the wheel can be readily rotated by frictional engagement with the edge portion of the film.

I claim:

1. In a camera, a shutter mechanism including a member necessarily movable in effecting an exposure, and means for locking said member against movement, said locking means comprising a flexible elongated member having one end thereof connected to said first member and movable therewith under a compressional force, and means associated with the other end of said elongated member for locking the same against movement under a compressional force.

2. In a camera, a shutter mechanism including a member necessarily movable in one direction in effecting an exposure, and means for locking said member against such movement, said means comprising a flexible elongated motion transmitting member having one end thereof connected to said first member whereby movement of said one member in said one direction applies a compressional force upon said elongated member to effect linear movement of said elongated member in one direction, and means associated with the other end of said elongated member for releasably locking the other end of said elongated member against movement under a compressional force.

3. In a camera including a body portion having a dark space, a shutter support adjustable relative to the body, and an extensible bellows connecting the body with the shutter support, the combination of shutter mechanism carried by the body and including a member necessarily movable in one direction to effect an exposure, an elongated flexible motion transmitting member having one end thereof connected with said first member, whereby motion of said first member in said one direction applies a compressional force upon said elongated member to effect linear movement of said elongated member in a corresponding direction, and means associated with the other end of said elongated member and mounted upon the body for releasably locking the same against movement under a compressional force.

4. In a camera having a body portion adapted to hold a movable film, releasable locking means comprising a roller carried by the body and having its peripheral surface adapted to engage the film, whereby movement of the film causes rotation of the roller, a thrust transmitting member mounted for movement relative to the roller, an abutment surface, means for positioning said member to engage with the abutment surface whereby movement of the same is restricted, and means operative upon rotation of the roller for displacing said member so as not to engage with the abutment surface upon movement of the same.

5. In a camera having a body portion adapted to hold a movable film, releasable locking means comprising a roller carried by the body and having its peripheral surface adapted to engage the film, whereby movement of the film causes rotation of the roller, an elongated thrust transmitting member mounted on the body for movement in the direction of its length, means operative upon movement of said member from one position to a second position, and then back to the first position, to restrict said member against movement of the same toward said second position, and means operative upon rotation of the roller for enabling said member to again move towards said second position.

6. In a camera having a body portion adapted to hold a movable film, releasable locking means comprising a roller carried by the body and having its peripheral surface adapted to engage the film, whereby movement of the film causes rotation of the roller, an elongated thrust transmitting member mounted on the body for movement in the direction of its length, a thrust finger secured to the end of said member and extending in proximity to said roller and at right angles to the axis of rotation thereof, said finger being resilient with respect to lateral bending, a helical groove formed on a portion of the roller, said finger being arranged so that it is urged by its inherent resilience in engagement with said groove, a relatively stationary abutment, said finger by its inherent resilience being also biased toward a position to engage the abutment and thus restrict movement of the elongated member, and a camlike deflecting surface associated with the abutment, said deflecting surface being so arranged and so formed that when the finger is not positioned to engage the abutment, movement of the elongated member from one position to a second position and back to the first position causes the finger to assume a position to engage the abutment, said finger in said last mentioned position being engaged with the threads of the roller whereby rotation of the roller in one direction by movement of the film displaces the finger laterally so as not to engage the abutment.

7. In a camera, a body portion adapted to hold a movable sensitized member, a shutter mechanism operable to effect an exposure, means for locking the shutter mechanism following each operation of the same to effect an exposure, said locking means comprising an elongated flexible member having one end thereof in communication with said shutter mechanism and movable therewith under a compressional force applied thereto, an abutment member against which the opposite end of said flexible member is movable to effect a locked condition wherein a compressional force applied against said flexible member is ineffective to impart movement to the same, means under the control of said sensitized member for directing the end of said elongated member against said abutment member after each actuation of the shutter and operable upon movement of the sensitized member to direct the end of the flexible member away from the abutment member.

In testimony whereof, I have hereunto set my hand.

WINSOR JOSSELYN.